United States Patent [19]
Bennett

[11] 3,744,809
[45] July 10, 1973

[54] HEAVY DUTY COLLET OPERATED CHUCK
[76] Inventor: Herbert E. Bennett, Route 4, Beloit, Wis. 53511
[22] Filed: Sept. 7, 1971
[21] Appl. No.: 178,350

[52] U.S. Cl.................. 279/121, 279/1 SJ, 279/51, 279/123
[51] Int. Cl....................... B23b 31/10, B23b 31/20
[58] Field of Search...................... 279/1 SJ, 41, 51, 279/74, 119, 121, 123, 50

[56] References Cited
UNITED STATES PATENTS
2,749,136  6/1956  Smerz.................................. 279/50
2,828,536  4/1958  Kaiser............................ 279/123 X

*Primary Examiner*—Francis S. Husar
*Attorney*—Armin B. Pagel

[57] ABSTRACT

The disclosure relates to an improved heavy duty lathe chuck provided with radially disposed jaws that are positively connected to an actuating collet and slidably supported in mating radial slots in the body of the chuck.

5 Claims, 3 Drawing Figures

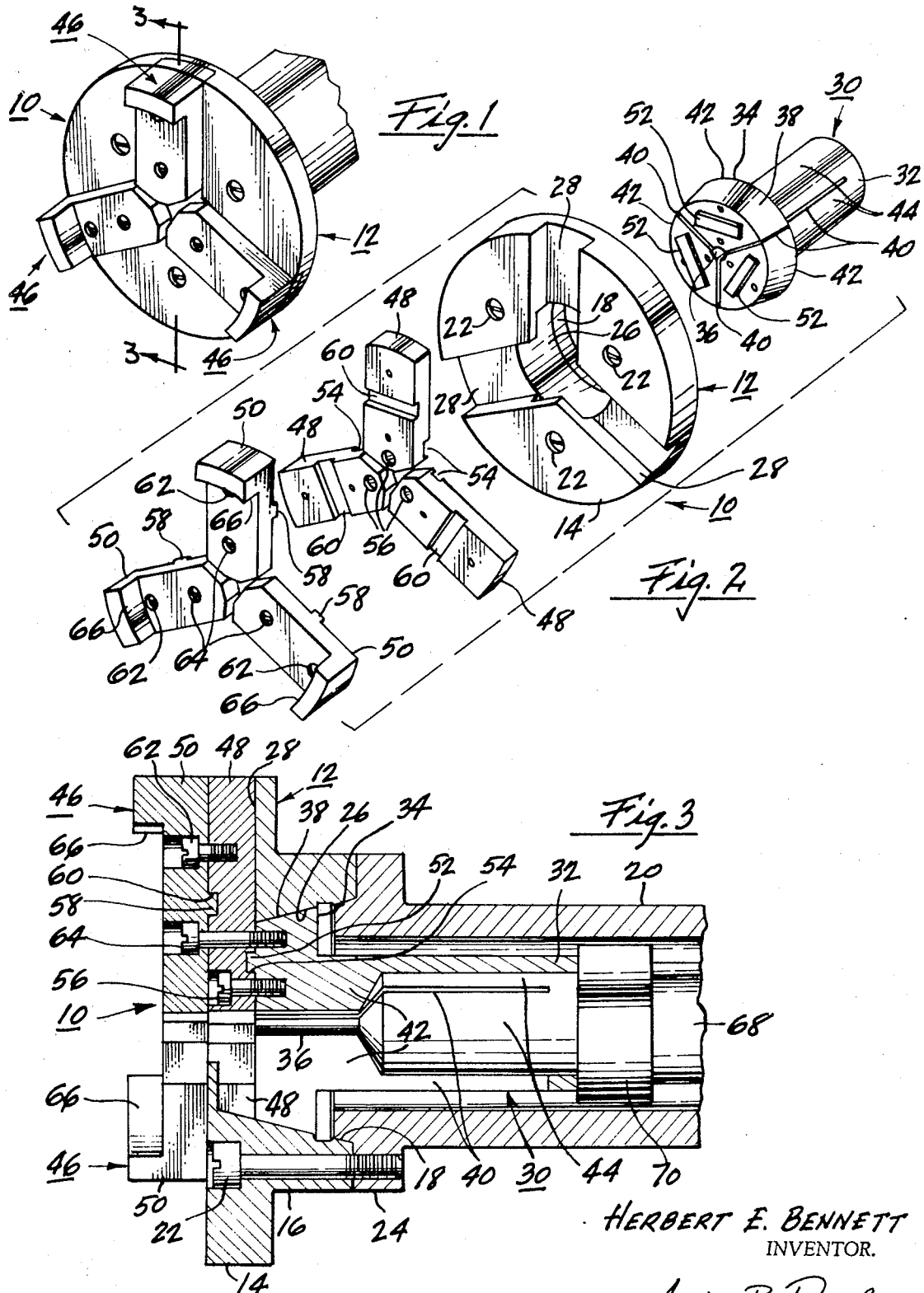

HEAVY DUTY COLLET OPERATED CHUCK

BACKGROUND OF THE INVENTION

1. Field of the Invention

The present invention relates to lathe chucks and more particularly to an improved heavy duty chuck provided with radially disposed jaws that are positively connected to an actuating collet and slidably supported in mating radial slots in the body of the chuck.

2. Brief Description of the Prior Art

For many years, collet-type chucks have been employed on metal working lathes in situations that require a workpiece to be held accurately in concentric relation to the rotational axis of the lathe spindle. Such a chuck typically includes a tubular collet member divided into several longitudinal segments provided with an external tapered conical surface that mates with a correspondingly tapered internal conical surface in the chuck body or the lathe spindle. By means of an appropriate operating mechanism, the conical collet section is forced axially into engagement with the mating internal surface of the chuck body, thereby slightly contracting the collet member to grip a cylindrical workpiece received in the central collet bore. Alternatively, it is also known to provide the end faces of the collet segments with either integral or removable jaws so that the chuck can grip a workpiece larger than the collet bore.

In a conventional collet chuck of the type described above, a key may be provided to prevent relative rotation between the collet member and the lathe spindle or the chuck body, but the driving torque is essentially transmitted to the workpiece through the frictional engagement between the mating tapered surfaces that serve to close the collet. Because these tapered surfaces are only in line contact with each other except at one specific axial position of the collet, relative slippage can score and ruin one or both of those surfaces. Similarly, excessive axial closing force can also damage the chuck by denting or coining one or both of the tapered collet actuating surfaces along the line of mutual contact. Furthermore, if the workpiece is held by jaws attached to the ends of the collet segments and is of substantially greater diameter than the tapered collet actuating surfaces, the leverage tending to produce slippage between the collet actuating surfaces is greater than that tending to cause slippage between the jaws and the workpiece. In view of these considerations, it will therefore be apparent that in heavy machining operations requiring high driving torque, sufficient frictional engagement to prevent relative slippage between the collet actuating surfaces cannot always be achieved without danger of damaging those critical surfaces.

SUMMARY OF THE INVENTION

A principle object of the present invention is to provide a simple, reliable and highly accurate collet-type lathe chuck capable of transmitting high driving torque from a lathe spindle to a chucked workpiece without danger of damaging the mating collet actuating surfaces of the chuck.

Another object of the invention is to provide such a chuck that is relatively compact in its axial dimensions.

Still another object of the invention is to provide a collet-type chuck comprising a minimum number of components that can be easily disassembled and reassembled for cleaning and maintenance purposes.

Yet another object of the invention is to provide the subject chuck with work holding jaws that can be easily replaced without disassembling the chuck or removing it from the lathe.

Briefly, these and other related objectives are achieved in accordance with the invention by means of a construction in which a collet-type chuck is provided with a rigid body member adapted to be mounted to a lathe spindle in fixed concentric relation thereto. The body member includes radial guide slots in its end face that slidably receive corresponding jaws mounted directly to the corresponding longitudinal collet segments of a collet member received in a central rearwardly facing bore of the body member. External tapered surfaces of the collet segments mate with a correspondingly tapered conical surface in the body member bore; thereby assuring that the collet member and the jaws are always in absolutely concentric relation to the spindle axis and to the radially disposed jaw guide slots. Because the jaws are slidably received in the radial slots of the body member, the driving torque is transmitted to the workpiece directly through the body member and the jaws; thereby positively preventing the collet member from rotating relative to the body member and eliminating the need for excessive collet actuating forces.

Various means for practicing the invention and other advantages and novel features thereof will be apparent from the following detailed descriptions of an illustrative preferred embodiment of the invention, reference being made to the accompanying drawing in which like reference characters denote like elements.

BRIEF DESCRIPTION OF THE DRAWINGS

FIG. 1 is a perspective view of a collet-type chuck according to a preferred embodiment of the invention, showing the chuck attached to a lathe spindle;

FIG. 2 is an exploded perspective view of the chuck depicted in FIG. 1; and

FIG. 3 is an enlarged cross-sectional view taken along lines 3—3 of FIG. 1.

DESCRIPTION OF THE ILLUSTRATIVE PREFERRED EMBODIMENT

The illustrative chuck 10 depicted in the accompanying drawings comprises a one-piece body member 12 in the form of a cylindrical disk 14 integral with a rearwardly facing cylindrical hub 16. As best illustrated in FIG. 3, hub 16 is bored to provide a tapered internal conical surface 18 that mates with the corresponding external taper of a conventional tubular lathe spindle 20. Three uniformly spaced mounting bolts 22 extend through mating holes in the body member and are threaded into flange 24 of the spindle; thus accurately mounting the chuck in concentric coaxial relation to the spindle axis. Alternatively, the body member can be threaded directly onto the spindle or mounted thereto by other conventional means. Beyond tapered surface 18, the bore of the body member is provided with a longer and more steeply tapered internal conical surface 26 that extends into the forward disk portion of that member in coaxial relation with surface 18 and spindle 20. This tapered bore, in turn, is intersected by three accurately machined symmetrically spaced radial jaw slots 28 in the face of the body member.

The collet 30 comprises a tubular sleeve 32 integral with an enlarged head 34 provided with an axial center hole 36 and with a tapered conical periphery 38 machined to mate with the internal tapered bore 26 of the body member. Three symmetrically spaced radial slots 40 extend longitudinally from the front face of the collet almost to the opposite end of its tubular sleeve; thus providing the collet head with three segments 42 supported by the corresponding resilient segments 44 of sleeve 32.

Each of the three chuck jaws 46 comprises a base member 48 made of hardened steel and a gripping member 50 that is preferably made of a more easily machinable type of steel or other material. The base members fit accurately into the corresponding slots 28 in the body member with tongues 52 on the faces of the collet head segments received in closely mating grooves 54 of the respective base members. Bolts 56 attach the base members 48 to the respective collet head segments 42; thereby preventing relative movement between the base members and their respective jaw segments and also retaining those components in assembled relation to the chuck body member. The gripping members 50 are provided with integral tongues 58 that mate with corresponding grooves 60 in the base members. A bolt 62 extends through each gripping member and is threaded into the respective base member and another bolt 64 extends through both members of each jaw and is threaded into the corresponding collet head segment. Accordingly, both elements of each jaw are rigidly attached to the collet, but the gripping members can be replaced by removing bolts 62 and 64 without detaching the base members from the collet. Obviously, a one-piece jaw can be substituted for the illustrated two-piece jaw construction, but only by sacrificing the advantageous features mentioned above.

When the illustrative chuck is fully assembled and is in its open condition shown in FIG. 3, the conical peripheral surfaces of the collet head segments are located toward the rear of the tapered internal bore 26 and the base members 48 of the chuck jaws are seated against the rearward surfaces of the corresponding jaw slots 28. With the collet and the jaws so positioned, the gripping surfaces 66 of the gripping members are spaced apart sufficiently to receive the particular work piece to be machined. As is well known in the metal working art, the gripping surfaces of the chuck jaws are machined in the lathe to match the size of that specific work piece; thereby insuring accurate concentricity and allowing the chuck to engage and release the work piece properly notwithstanding the limited radial jaw movement inherent in a collet-type chuck.

An actuating bar 68 is located within the bore of the tubular lathe spindle with its enlarged head 70 adapted to abut against the corresponding end of the tubular collet sleeve 32. At its opposite end, the actuating bar is connected to an appropriate operating mechanism such as a toggle linkage or an air cylinder, whereby the bar can be urged forcibly toward the lathe chuck from its illustrated retracted position. The movement of the actuating bar forces collet 30 and chuck jaws 46 rigidly attached thereto in the same direction and in a movement relative to stationary lathe spindle 20 and body member 12. Thus base members 48 are displaced from the rearward surfaces of the corresponding jaw slots 28. As such movement of the actuating bar forces the collet head segments into the tapered bore 26, the jaws attached to the collet head segments are obviously moved toward the axis of the chuck but remain in concentric relation thereto. Consequently, chuck jaws 46 move axially as well as radially in the corresponding jaw slots 28, and because the movements are very small, base members 48 are still retained in the corresponding jaw slots 28. By virtue of the rugged construction of the entire chuck and the relatively gradual taper of bore 26, it will be apparent that the chuck jaws can exert a very powerful gripping action on the work piece. Because the chuck jaws are slidably received in the radial slots 28 in the chuck body, however, very high torque can be imparted from the lathe spindle to the work piece directly through the chuck body and jaws without any danger of rotational slippage between the collet member and the chuck body and without sacrificing the accuracy of the chuck.

The invention has been described with particular reference to an illustrative preferred embodiment thereof but it will be apparent that variations and modifications can be effected within the spirit and scope of the invention as described hereinabove and as defined in the appended claims.

I claim:

1. A collet operated chuck comprising
   a. a body member provided with an axial bore including an internal tapered collet actuating surface,
   b. means for rigidly mounting said body member to a rotatable spindle in coaxial relation thereto,
   c. a collet member including a plurality of collet segments received in said axial bore and provided with respective external tapered surfaces that engage and cooperate with said internal tapered surface of said bore to effect symmetrical radial contraction of said collet segments in response to axial displacement of said collet member in a predetermined direction relative to said body member,
   d. means defining a plurality of radially disposed guide slots in the end face of said body member opposite said spindle and in communication with said bore,
   e. a plurality of jaws respectively received closely and guidingly in said guide slots for radial sliding movement relative to the axis of said body members, and
   f. connecting means rigidly connecting each of said jaws to a corresponding one of said collet segments, whereby said axial displacement of said collet member effects symmetrical radial movement of said jaws along said guide slots toward the axis of said body member.

2. A chuck according to claim 1 in which said collet segments include forwardly facing surfaces generally parallel to said end face of said body member and in which said jaws are provided with rearwardly facing surfaces engaged respectively with said forwardly facing surfaces of said collet segments, said connecting means comprising bolts extending through mating holes in said jaws and threaded into said collet segments to maintain said rearwardly facing surfaces of said jaws in immovable engagement with said forwardly facing surfaces of said collet segments.

3. A chuck according to claim 2 in which said forwardly facing collet surfaces and said rearwardly facing jaw surfaces define mating tongue and groove joints between said jaws and the corresponding collet segments, said joints being disposed transversely to the direction of radial movement of said jaws.

4. A chuck according to claim 1 in which each of said jaws comprises a relatively hard base member slidably received in the corresponding one of said guide slots in accurately fitting relation thereto and a relatively soft gripping member rigidly attached to said base member and projecting beyond said end face of said body member.

5. A chuck according to claim 4 in which said connecting means includes a first set of bolts rigidly connecting said base members to the corresponding ones of said collet segments and a second set of bolts rigidly connecting said gripping member to the corresponding ones of said base members, whereby the removal of said second set of bolts allows said gripping members to be removed from said chuck without detaching said base members from their respective collet segments.

* * * * *